(12) United States Patent
Liu et al.

(10) Patent No.: US 12,273,840 B2
(45) Date of Patent: Apr. 8, 2025

(54) BLUETOOTH VOICE COMMUNICATION SYSTEM AND RELATED COMPUTER PROGRAM PRODUCT FOR GENERATING STEREO VOICE EFFECT

(71) Applicant: Realtek Semiconductor Corp., Hsinchu (TW)

(72) Inventors: Yu Hsuan Liu, Hsinchu (TW); Qing Gu, Suzhou (CN); Bi Wei, Suzhou (CN); Hung Chuan Chang, Hsinchu (TW); Yi-Cheng Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 337 days.

(21) Appl. No.: 17/939,234

(22) Filed: Sep. 7, 2022

(65) Prior Publication Data
US 2023/0102871 A1 Mar. 30, 2023

(30) Foreign Application Priority Data
Sep. 29, 2021 (CN) .......................... 202111151833.4

(51) Int. Cl.
*H04W 56/00* (2009.01)
*H04L 69/22* (2022.01)

(52) U.S. Cl.
CPC .......... *H04W 56/005* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 11,102,565 B1* | 8/2021 | Girardier | ................ H04W 4/80 |
| 2006/0079271 A1* | 4/2006 | Lee | ................... H04M 1/72403 |
| | | | 455/550.1 |
| 2011/0286615 A1* | 11/2011 | Olodort | ................ H04R 1/1025 |
| | | | 381/311 |
| 2015/0031288 A1 | 1/2015 | Tubbesing et al. | |
| 2017/0154636 A1* | 6/2017 | Geiger | ................ G10L 21/0316 |

(Continued)

OTHER PUBLICATIONS

Office Action for TW 110139160 dated Feb. 11, 2022.
Taiwanese Notice of Allowance for Taiwanese Application No. 110139160, dated Jan. 17, 2023, with an English translation.

*Primary Examiner* — Lonnie V Sweet
(74) *Attorney, Agent, or Firm* — Birch, Stewart, Kolasch & Birch, LLP

(57) ABSTRACT

A Bluetooth voice communication system includes: a Bluetooth host device arranged to operably conduct voice communication with a remote device; a first Bluetooth member device arranged to operably generate a left-channel voice data according to sounds captured by a first sound receiving circuit, and arranged to operably utilize a first Bluetooth communication circuit to transmit the left-channel voice data to the Bluetooth host device; and a second Bluetooth member device arranged to operably generate a right-channel voice data according to sounds captured by a second sound receiving circuit, and arranged to operably utilize a second Bluetooth communication circuit to transmit the right-channel voice data to the Bluetooth host device. The Bluetooth host device generates a stereo voice data based on the left-channel voice data and the right-channel voice data, and utilizes a signal transceiver circuit to transmit the stereo voice data to the remote device.

10 Claims, 3 Drawing Sheets

(56) References Cited

U.S. PATENT DOCUMENTS

2019/0166171 A1\* 5/2019 Jiang .................... G06F 16/958
2022/0038769 A1\* 2/2022 Meiyappan .......... H04N 21/439
2022/0039041 A1\* 2/2022 Zhu .................. H04L 12/40058
2023/0275986 A1\* 8/2023 Liu .................... H04M 1/6066
                                                            455/420

\* cited by examiner

BLUETOOTH VOICE COMMUNICATION SYSTEM AND RELATED COMPUTER PROGRAM PRODUCT FOR GENERATING STEREO VOICE EFFECT

CROSS-REFERENCE TO RELATED APPLICATIONS

This application claims the benefit of priority to Patent Application No. 202111151833.4, filed in China on Sep. 29, 2021; the entirety of which is incorporated herein by reference for all purposes.

BACKGROUND

The disclosure generally relates to a Bluetooth Low Energy Audio (Bluetooth LE Audio) technology and, more particularly, to a Bluetooth voice communication system and related computer program product for generating stereo voice effect.

The newly launched Bluetooth LE Audio technology based on Bluetooth Core Specification Version 5.2 is a significant update to the technical specifications of audio transmission over the past twenty years of development of Bluetooth technologies. The main advantage of the Bluetooth LE Audio technology is that the Bluetooth LE Audio technology can transmit audio with higher quality while significantly reducing power consumption.

In order to provide stereo sound effect when playing music, traditional (Legacy or BR/EDR) Bluetooth audio technology utilizes the asynchronous connection-oriented (ACL) logical transport to transmit stereo audio data. Since the ACL logical transport utilizes a retransmission mechanism, packets will be continuously retransmitted between the transmitting end of the Bluetooth signal and the receiving end of the Bluetooth signal in an environment with poor reception quality. Accordingly, the ACL logical transport is not suitable for use in voice communication applications since the voice communication applications require higher immediacy requirements for signal transmission.

When conducting a voice communication operation, traditional Bluetooth audio technology utilizes the synchronous connection-oriented (SCO) logical transport to transmit voice data. The SCO logical transport can meet the immediacy requirements of voice communications for signal transmission, but it cannot realize the function of creating stereo voice effect. In the related art, although Bluetooth LE Audio technology has better performance in playing music, it can only provide monotone sound effect just like traditional Bluetooth technology when conducting the voice communication.

SUMMARY

An example embodiment of a Bluetooth voice communication system is disclosed, comprising: a Bluetooth host device, arranged to operably conduct voice communication with a remote device, the Bluetooth host device comprising: a host-side Bluetooth communication circuit, arranged to operably receive or transmit Bluetooth packets; a Bluetooth packet parsing circuit, coupled with the host-side Bluetooth communication circuit, and arranged to operably to parse the Bluetooth packets received by the host-side Bluetooth communication circuit; a signal transceiver circuit, arranged to operably receive or transmit wireless signal; and a processing circuit, coupled with the host-side Bluetooth communication circuit, the Bluetooth packet parsing circuit, and the signal transceiver circuit, and arranged to operably control operations of the host-side Bluetooth communication circuit, the Bluetooth packet parsing circuit, and the signal transceiver circuit; a first Bluetooth member device, comprising: a first Bluetooth communication circuit, arranged to operably receive or transmit Bluetooth packets; a first voice receiving circuit, arranged to operably capture sounds; a first audio playback circuit, arranged to operably playback a first audio signal; a first audio processing circuit, coupled with the first voice receiving circuit and the first audio playback circuit, and arranged to operably generate the first audio signal, and arranged to operably generate a left-channel voice data based on sounds captured by the first voice receiving circuit; and a first control circuit, coupled with the first Bluetooth communication circuit and the first audio processing circuit, and arranged to operably utilize the first Bluetooth communication circuit to transmit the left-channel voice data to the Bluetooth host device; and a second Bluetooth member device, comprising: a second Bluetooth communication circuit, arranged to operably receive or transmit Bluetooth packets; a second voice receiving circuit, arranged to operably capture sounds; a second audio playback circuit, arranged to operably playback a second audio signal; a second audio processing circuit, coupled with the second voice receiving circuit and the second audio playback circuit, and arranged to operably generate the second audio signal, and arranged to operably generate a right-channel voice data based on sounds captured by the second voice receiving circuit; and a second control circuit, coupled with the second Bluetooth communication circuit and the second audio processing circuit, and arranged to operably utilize the second Bluetooth communication circuit to transmit the right-channel voice data to the Bluetooth host device; wherein the host-side Bluetooth communication circuit is further arranged to operably receive the left-channel voice data transmitted from the first Bluetooth communication circuit and the right-channel voice data transmitted from the second Bluetooth communication circuit, and the processing circuit is further arranged to operably generate a stereo voice data based on the left-channel voice data and the right-channel voice data and arranged to operably utilize the signal transceiver circuit to transmit the stereo voice data to the remote device.

An example embodiment of a computer program product is disclosed. The computer program product is stored in a storage circuit of a Bluetooth host device which is utilized to conduct voice communication with a remote device, when executed by a processing circuit of the Bluetooth host device, enabling the Bluetooth host device to conduct a stereo voice generating operation. The computer program product comprises: a left-channel processing module, arranged to operably utilize a host-side Bluetooth communication circuit of the Bluetooth host device to receive a left-channel voice data transmitted from a first Bluetooth member device; a right-channel processing module, arranged to operably utilize the host-side Bluetooth communication circuit to receive a right-channel voice data transmitted from a second Bluetooth member device; and a stereo generation module, arranged to operably generate a stereo voice data based on the left-channel voice data and the right-channel voice data, and arranged to operably utilize a signal transceiver circuit of the Bluetooth host device to transmit the stereo voice data to the remote device.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
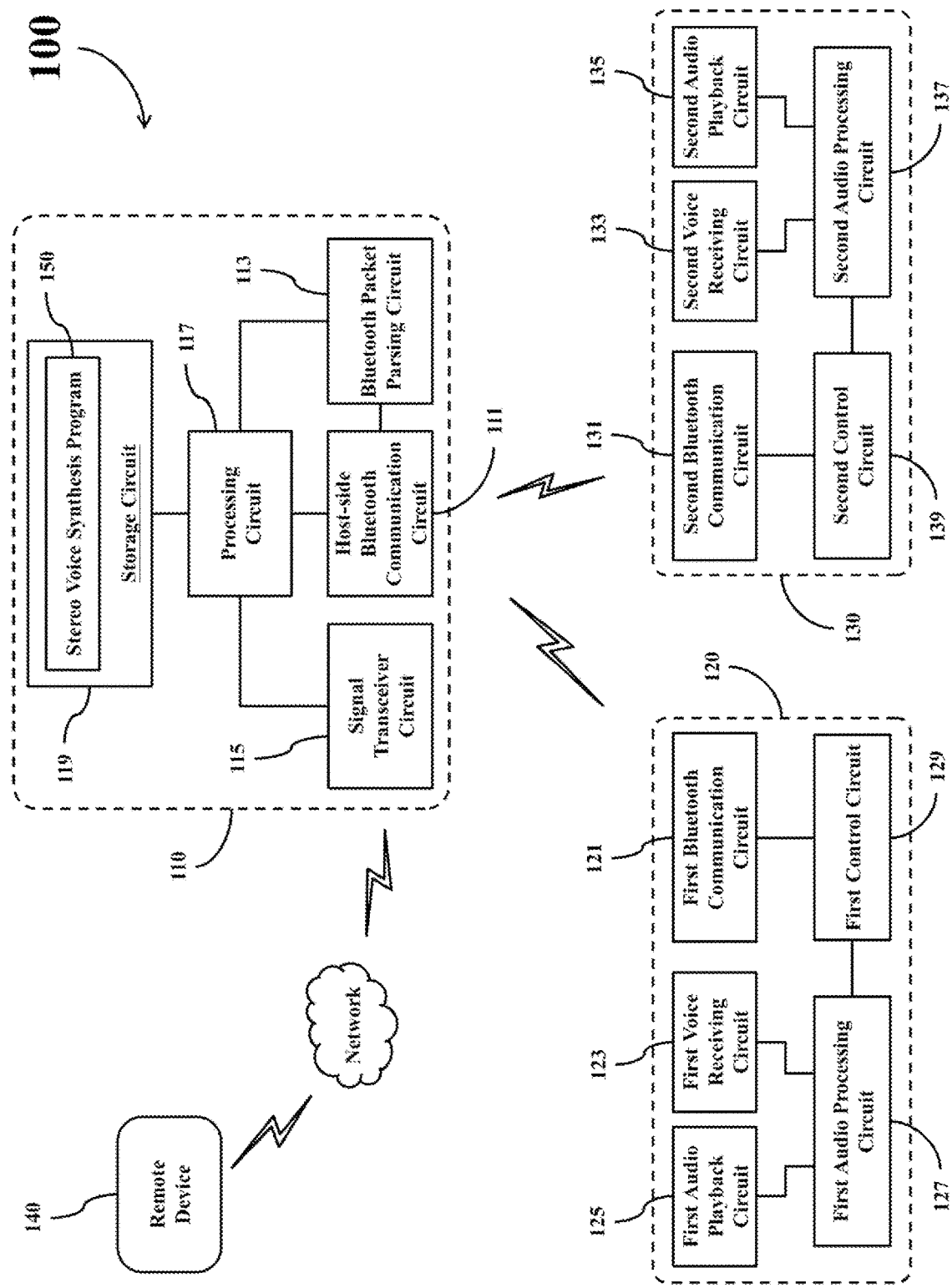
FIG. 1 shows a simplified functional block diagram of a Bluetooth voice communication system according to one embodiment of the present disclosure.

FIG. 1 shows a simplified functional block diagram of a Bluetooth voice communication system 100 according to one embodiment of the present disclosure. The Bluetooth voice communication system 100 comprises a Bluetooth host device 110, a first Bluetooth member device 120, and a second Bluetooth member device 130. The user of the Bluetooth voice communication system 100 (hereinafter referred to as local user) may utilize the Bluetooth voice communication system 100 to conduct voice communication with the user of a remote device 140 (hereinafter referred to as remote user).

In this embodiment, the Bluetooth host device 110 comprises a host-side Bluetooth communication circuit 111, a Bluetooth packet parsing circuit 113, a signal transceiver circuit 115, a processing circuit 117, and a storage circuit 119. The first Bluetooth member device 120 comprises a first Bluetooth communication circuit 121, a first voice receiving circuit 123, a first audio playback circuit 125, a first audio processing circuit 127, and a first control circuit 129. The second Bluetooth member device 130 comprises a second Bluetooth communication circuit 131, a second voice receiving circuit 133, a second audio playback circuit 135, a second audio processing circuit 137, and a second control circuit 139.

In the Bluetooth host device 110, the host-side Bluetooth communication circuit 111 is arranged to operably receive or transmit Bluetooth packets. The Bluetooth packet parsing circuit 113 is coupled with the host-side Bluetooth communication circuit 111, and arranged to operably parse the Bluetooth packets received by the host-side Bluetooth communication circuit 111. The signal transceiver circuit 115 is arranged to operably utilize various wired network transmission technologies or Radio Access Technologies (RATs) to receive voice data transmitted from the remote device 140 through various networks (e.g., Internet, mobile communication network, or various private networks), and arranged to operably utilize the aforementioned wired network transmission technologies or RATs to transmit voice data to the remote device 140 through various networks. The processing circuit 117 is coupled with the host-side Bluetooth communication circuit 111, the Bluetooth packet parsing circuit 113, and the signal transceiver circuit 115, and arranged to operably control operations of the host-side Bluetooth communication circuit 111, the Bluetooth packet parsing circuit 113, and the signal transceiver circuit 115. The storage circuit 119 is coupled with the processing circuit 117, and arranged to operably store a stereo voice synthesis program 150.

The aforementioned RATs may be various 2nd Generation (2G) mobile communication technologies, various 3rd Generation (3G) mobile communication technologies, various 4th Generation (4G) mobile communication technologies, various 5th Generation (5G) mobile communication technologies, various wireless network communication technologies specified by the IEEE 802.11 series, various Internet-of-Thing (IoT) communication technologies, various Narrow Band Internet of Thing (NB-IoT) communication technologies, various Vehicle-to-Vehicle communication technologies, various Vehicle-to-Everything (V2X) communication technologies, various satellite communication technologies, various wireless communication technologies set by other standard setting organizations, or the like.

In practice, the aforementioned host-side Bluetooth communication circuit 111 may be realized with various appropriate Bluetooth transmission circuits supporting the Bluetooth LE Audio technology specified by the Bluetooth Core Specification Version 5.2 (or a newer version). The Bluetooth packet parsing circuit 113 may be realized with various packet demodulation circuits, digital computing circuits, micro-processors, or Application Specific Integrated Circuits (ASICs) capable of parsing Bluetooth packets. The signal transceiver circuit 115 may be realized with various appropriate circuits or chips supporting the aforementioned wired network transmission technologies or one or more types of the aforementioned RATs, such as a Network Interface Card (NIC), a Wi-Fi circuit, a mobile communication circuit, a satellite communication circuit, an IoT communication circuit, or the like. The signal transceiver circuit 115 may be realized with various hybrid circuits integrating the aforementioned wired network transmission technologies, and one or more types of the aforementioned RATs. The processing circuit 117 may be realized with a single processor module, a combination of multiple processor modules, a single computer system, a combination of multiple computer systems, a single server, a combination of multiple servers, or a cloud computing system having appropriate computing ability. The storage circuit 119 may be realized with various volatile storage devices, non-volatile storage devices, database systems, or cloud storage systems.

In some embodiments, the aforementioned host-side Bluetooth communication circuit 111 and/or the Bluetooth packet parsing circuit 113 may be integrated into the signal transceiver circuit 115.

In practical applications, different functional blocks of the aforementioned Bluetooth host device 110 may be realized with separate circuits, or may be integrated into a mobile communication device (e.g., a mobile phone), a wearable device, a tablet computer, a laptop computer, a desktop computer, a vehicular audio system, a satellite communication device, or a smart speaker.

In the general usage scenario, the first Bluetooth member device 120 may be placed on the left side of the local user (e.g., the first Bluetooth member device 120 may be placed on the left-hand side of the local user or in the left ear of the local user), and the second Bluetooth member device 130 may be placed on the right side of the local user (e.g., the second Bluetooth member device 130 may be placed on the right-hand side of the local user or in the right ear of the local user).

In the first Bluetooth member device 120, the first Bluetooth communication circuit 121 is arranged to operably receive or transmit Bluetooth packets. The first voice receiving circuit 123 is arranged to operably capture sounds. The first audio playback circuit 125 is arranged to operably playback a first audio signal. The first audio processing circuit 127 is coupled with the first voice receiving circuit 123 and the first audio playback circuit 125, and arranged to operably generate the aforementioned first audio signal, and arranged to operably generate a left-channel voice data based on sounds captured by the first voice receiving circuit 123. The first control circuit 129 is coupled with the first Bluetooth communication circuit 121 and the first audio processing circuit 127, and arranged to operably utilize the first Bluetooth communication circuit 121 to transmit the left-channel voice data to the Bluetooth host device 110.

In the second Bluetooth member device 130, the second Bluetooth communication circuit 131 is arranged to operably receive or transmit Bluetooth packets. The second voice receiving circuit 133 is arranged to operably capture sounds. The second audio playback circuit 135 is arranged to operably playback a second audio signal. The second audio processing circuit 137 is coupled with the second voice receiving circuit 133 and the second audio playback circuit 135, and arranged to operably generate the aforementioned second audio signal, and arranged to operably generate a right-channel voice data based on sounds captured by the second voice receiving circuit 133. The second control circuit 139 is coupled with the second Bluetooth communication circuit 131 and the second audio processing circuit 137, and arranged to operably utilize the second Bluetooth communication circuit 131 to transmit the right-channel voice data to the Bluetooth host device 110.

In practice, each of the aforementioned first Bluetooth communication circuit 121 and second Bluetooth communication circuit 131 may be realized with various appropriate Bluetooth transmission circuits supporting the Bluetooth LE Audio technology specified by the Bluetooth Core Specification Version 5.2 (or a newer version). Each of the first voice receiving circuit 123 and the second voice receiving circuit 133 may be realized with various appropriate circuits capable of capturing sounds and converting the captured sounds into corresponding audio signals, such as various types of microphones. Each of the first audio playback circuit 125 and the second audio playback circuit 135 may be realized with various appropriate circuits having a sound playback capability, such as various types of speakers. Each of the first audio processing circuit 127 and the second audio processing circuit 137 may be realized with various digital computing circuits, microprocessors, or Application Specific Integrated Circuits (ASICs) capable of encoding and decoding sound signals. Each of the first control circuit 129 and the second control circuit 139 may be realized with various micro-processors or digital signal processing circuits having appropriate computing capability.

In addition, different functional blocks of the aforementioned first Bluetooth member device 120 may be realized with separate circuits, or may be integrated into a single wearable Bluetooth device. Moreover, if needed, the first Bluetooth communication circuit 121 may be coupled with additional antenna devices (not shown in figures). Similarly, different functional blocks of the aforementioned second Bluetooth member device 130 may be realized with separate circuits, or may be integrated into a single wearable Bluetooth device. Moreover, if needed, the second Bluetooth communication circuit 131 may be coupled with additional antenna devices (not shown in figures).

Figure 2:
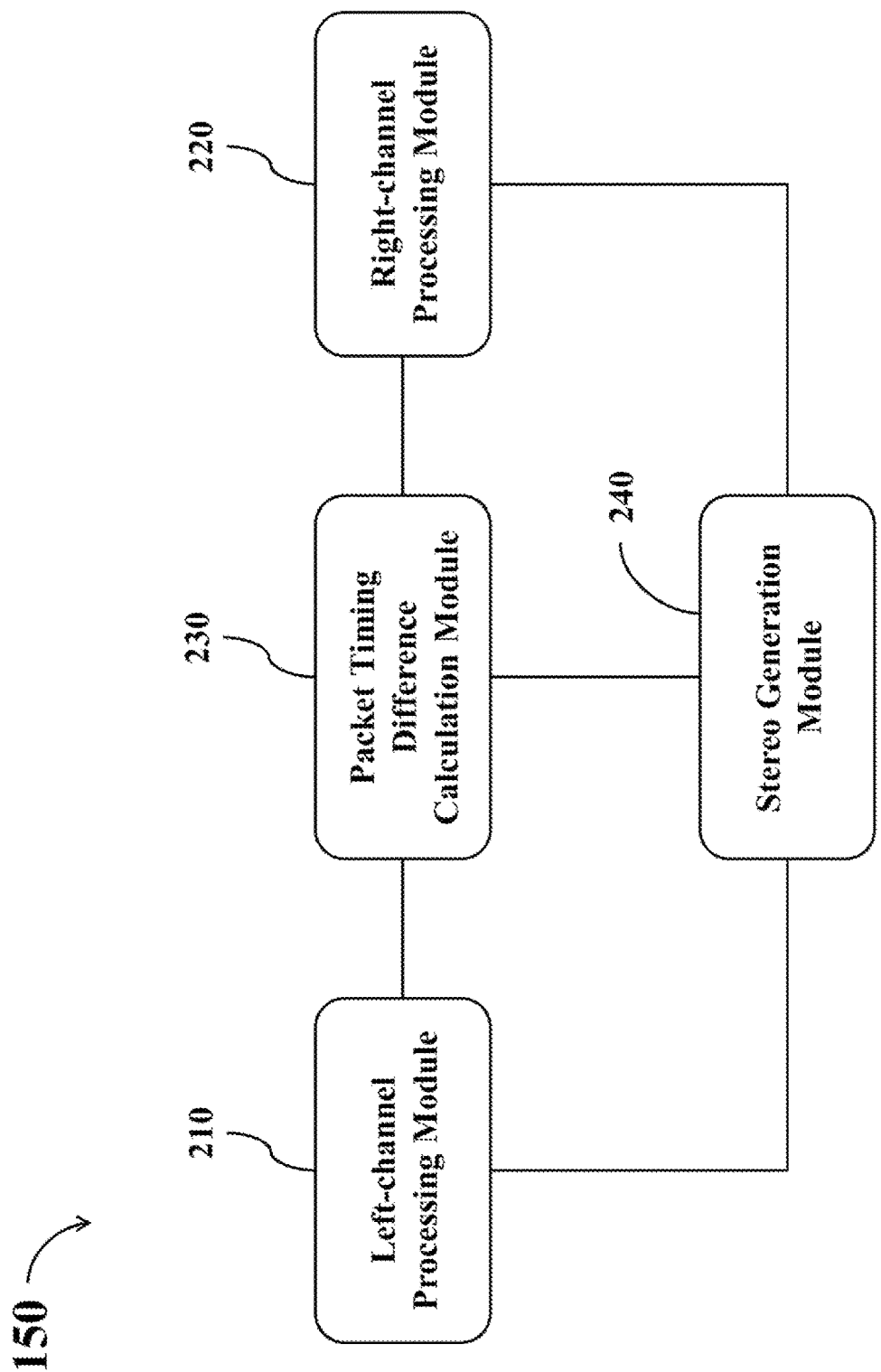
FIG. 2 shows a simplified functional module diagram of a stereo voice synthesis program in a Bluetooth host device in FIG. 1 according to one embodiment of the present disclosure.

The stereo voice synthesis program 150 in the aforementioned Bluetooth host device 110 may be realized with a computer program product formed by one or more functional modules. For example, FIG. 2 shows a simplified functional module diagram of the stereo voice synthesis program 150 in the Bluetooth host device 110 according to one embodiment of the present disclosure. In this embodiment, the stereo voice synthesis program 150 comprises a left-channel processing module 210, a right-channel processing module 220, a packet timing difference calculation module 230, and a stereo generation module 240.

In operations, the host-side Bluetooth communication circuit 111 of the Bluetooth host device 110 may receive the left-channel voice data transmitted from the first Bluetooth communication circuit 121, and may receive the right-channel voice data transmitted from the second Bluetooth communication circuit 131. The processing circuit 117 may generate a stereo voice data based on the left-channel voice data and the right-channel voice data, and may utilize the signal transceiver circuit 115 to transmit the stereo voice data to the remote device 140 so as to realize stereo voice communication.

Figure 3:
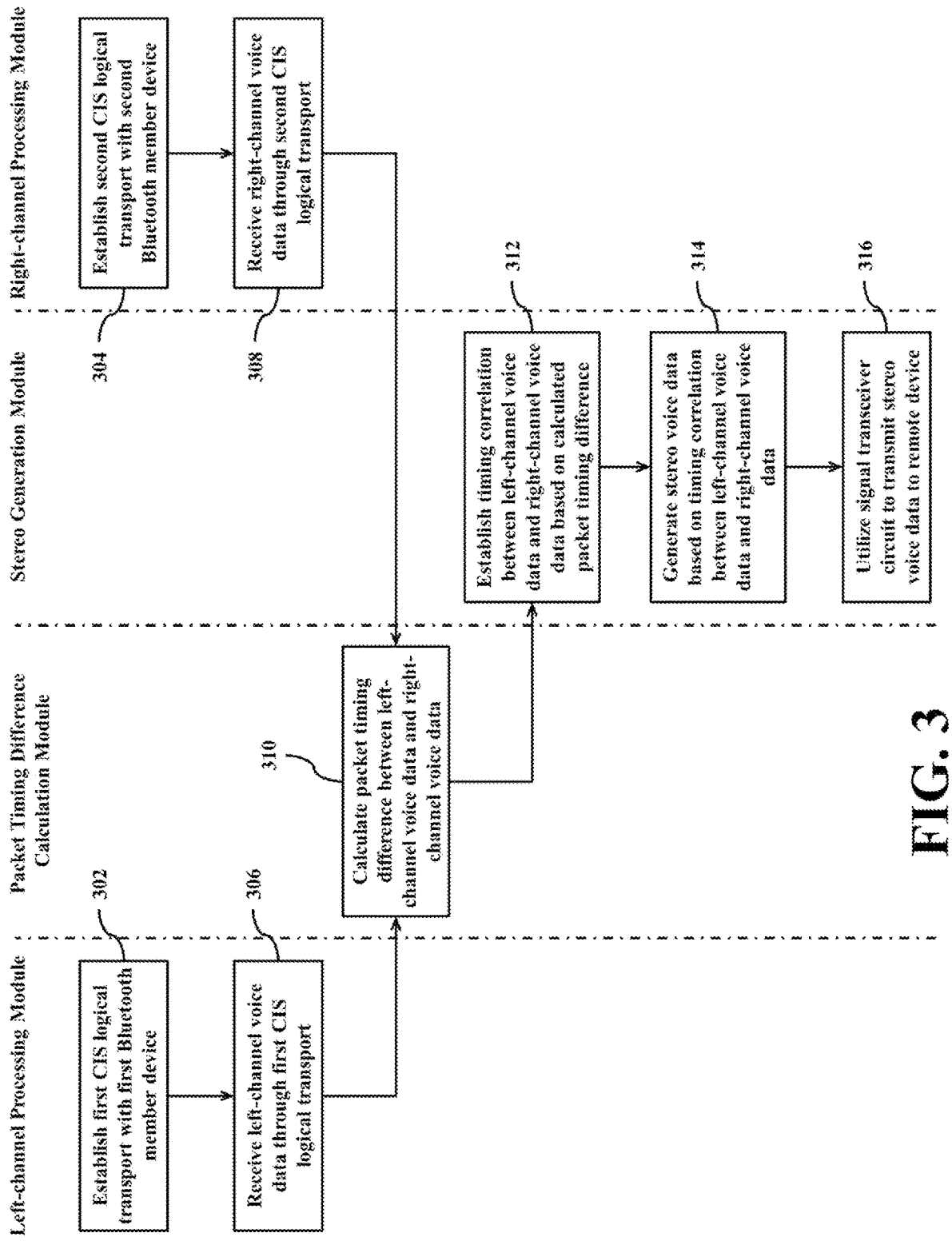
FIG. 3 shows a simplified flowchart of a method for generating stereo voice effect according to one embodiment of the present disclosure.

The operations of stereo voice communication conducted by the Bluetooth voice communication system 100 and the remote device 140 will be further described below by reference to FIG. 3. FIG. 3 shows a simplified flowchart of a method for generating stereo voice effect according to one embodiment of the present disclosure.

In the flowchart of FIG. 3, operations within a column under the name of a specific device are operations to be performed by the specific device. For example, operations within a column under the label "left-channel processing module" are operations to be performed by the left-channel processing module 210; operations within a column under the label "right-channel processing module" are operations to be performed by the right-channel processing module 220; operations within a column under the label "packet timing difference calculation module" are operations to be performed by the packet timing difference calculation module 230; operations within a column under the label "stereo generation module" are operations to be performed by the stereo generation module 240.

When the local user manipulates the Bluetooth voice communication system 100 to transmit a voice communication request to the remote device 140, or when the Bluetooth voice communication system 100 receives a voice communication request transmitted from the remote device 140, the processing circuit 117 of the Bluetooth host device 110 may execute the stereo voice synthesis program 150 stored in the storage circuit 119 to enable the Bluetooth host device 110 to conduct a stereo voice generating operation.

In this situation, the left-channel processing module 210 of the stereo voice synthesis program 150 may perform the operation 302 of FIG. 3, and the right-channel processing module 220 of the stereo voice synthesis program 150 may perform the operation 304 of FIG. 3.

In the operation 302, the left-channel processing module 210 may control the processing circuit 117 to establish a Connected Isochronous Stream (CIS) logical transport between the host-side Bluetooth communication circuit 111 and the first Bluetooth member device 120, and the above CIS logical transport is hereinafter referred to as first CIS logical transport.

In the operation 304, the right-channel processing module 220 may control the processing circuit 117 to establish a CIS logical transport between the host-side Bluetooth communication circuit 111 and the second Bluetooth member device 130, and the above CIS logical transport is hereinafter referred to as second CIS logical transport.

In operations, the processing circuit 117 may control the host-side Bluetooth communication circuit 111 to conduct a Bluetooth pairing procedure with the first Bluetooth communication circuit 121 of the first Bluetooth member device 120 by adopting various appropriate mechanisms, where the host-side Bluetooth communication circuit 111 acts as a Bluetooth Central, and the first Bluetooth communication circuit 121 acts as a Bluetooth Peripheral. After the Bluetooth pairing procedure between the host-side Bluetooth communication circuit 111 and the first Bluetooth communication circuit 121 is completed, the processing circuit 117 may instruct the host-side Bluetooth communication circuit 111 to establish the first CIS logical transport between the host-side Bluetooth communication circuit 111 and the first Bluetooth communication circuit 121, and may instruct the host-side Bluetooth communication circuit 111 to utilize the aforementioned first CIS logical transport to conduct voice data transmission with the first Bluetooth communication circuit 121.

Similarly, the processing circuit 117 may control the host-side Bluetooth communication circuit 111 to conduct a Bluetooth pairing procedure with the second Bluetooth communication circuit 131 of the second Bluetooth member device 130 by adopting various appropriate mechanisms, where the host-side Bluetooth communication circuit 111 acts as a Bluetooth Central, and the second Bluetooth communication circuit 131 acts as a Bluetooth Peripheral. After the Bluetooth pairing procedure between the host-side Bluetooth communication circuit 111 and the second Bluetooth communication circuit 131 is completed, the processing circuit 117 may instruct the host-side Bluetooth communication circuit 111 to establish the second CIS logical transport between the host-side Bluetooth communication circuit 111 and the second Bluetooth communication circuit 131, and may instruct the host-side Bluetooth communication circuit 111 to utilize the aforementioned second CIS logical transport to conduct voice data transmission with the second Bluetooth communication circuit 131.

In one embodiment, the host-side Bluetooth communication circuit 111, the first Bluetooth communication circuit 121, and the second Bluetooth communication circuit 131 transmit various instructions and data among each other through the same Bluetooth piconet.

In another embodiment, the host-side Bluetooth communication circuit 111 and the first Bluetooth communication circuit 121 transmit various instructions and data with each other through a first Bluetooth piconet, and the host-side Bluetooth communication circuit 111 and the second Bluetooth communication circuit 131 transmit various instructions and data with each other through a second Bluetooth piconet which is different from the aforementioned first Bluetooth piconet.

During the period in which the Bluetooth voice communication system 100 conducts voice communication with the remote device 140, the first voice receiving circuit 123 of the first Bluetooth member device 120 and the second voice receiving circuit 133 of the second Bluetooth member device 130 may simultaneously capture sounds generated by the local user, and respectively generate corresponding sound signals. In operations, the first audio processing circuit 127 of the first Bluetooth member device 120 may generate a left-channel voice data based on sounds captured by the first voice receiving circuit 123. On the other hand, the second audio processing circuit 137 of the second Bluetooth member device 130 may generate a right-channel voice data based on sounds captured by the second voice receiving circuit 133.

The first control circuit 129 of the first Bluetooth member device 120 may convert the left-channel voice data generated by the first voice receiving circuit 123 into corresponding left-channel Bluetooth packets, and may utilize the first Bluetooth communication circuit 121 to transmit the left-channel Bluetooth packets to the host-side Bluetooth communication circuit 111 through the aforementioned first CIS logical transport. On the other hand, the second control circuit 139 of the second Bluetooth member device 130 may convert the right-channel voice data generated by the second voice receiving circuit 133 into corresponding right-channel Bluetooth packets, and may utilize the second Bluetooth communication circuit 131 to transmit the right-channel Bluetooth packets to the host-side Bluetooth communication circuit 111 through the aforementioned second CIS logical transport.

In this situation, the left-channel processing module 210 may perform the operation 306 of FIG. 3, and the right-channel processing module 220 may perform the operation 308 of FIG. 3.

In the operation 306, the left-channel processing module 210 may control the processing circuit 117 to utilize the host-side Bluetooth communication circuit 111 to receive the left-channel Bluetooth packets transmitted from the first Bluetooth communication circuit 121 through the aforementioned first CIS logical transport. Then, the left-channel processing module 210 may control the processing circuit 117 to utilize the Bluetooth packet parsing circuit 113 to parse the left-channel Bluetooth packets, so as to acquire the left-channel voice data generated by the first Bluetooth member device 120.

In the operation 308, the right-channel processing module 220 may control the processing circuit 117 to utilize the host-side Bluetooth communication circuit 111 to receive the right-channel Bluetooth packets transmitted from the second Bluetooth communication circuit 131 through the aforementioned second CIS logical transport. Then, the left-channel processing module 210 may control the processing circuit 117 to utilize the Bluetooth packet parsing circuit 113 to parse the right-channel Bluetooth packets, so as to acquire the right-channel voice data generated by the second Bluetooth member device 130.

In this embodiment, in addition to extracting the left-channel voice data from the left-channel Bluetooth packets generated by the first Bluetooth member device 120, the Bluetooth packet parsing circuit 113 may further acquire a CIS reference anchor point, a CIS synchronization delay (CIS_Sync_Delay), a CIG synchronization delay (CIG_Sync_Delay), a time offset (Time_Offset), an isochronous interval (ISO_Interval), a service data unit interval (SDU Interval), and/or a Timestamp related to the transmission timing of the left-channel voice data based on operations of receiving the left-channel Bluetooth packets conducted by the host-side Bluetooth communication circuit 111 or based on contents of the left-channel Bluetooth packets.

Similarly, in addition to extracting the right-channel voice data from the right-channel Bluetooth packets generated by the second Bluetooth member device 130, the Bluetooth packet parsing circuit 113 may further acquire a CIS reference anchor point, a CIS synchronization delay, a CIG synchronization delay, a time offset, an isochronous interval, a service data unit interval, and/or a Timestamp related to the transmission timing of the right-channel voice data based on operations of receiving the right-channel Bluetooth packets conducted by the host-side Bluetooth communication circuit 111 or based on contents of the right-channel Bluetooth packets.

In the operation 310, the packet timing difference calculation module 230 may control the processing circuit 117 to calculate the packet timing difference between the left-channel voice data and the right-channel voice data. In operations, the processing circuit 117 may calculate the packet timing difference between the left-channel voice data and the right-channel voice data based on at least one of the following: a CIS reference anchor point of the left-channel voice data, a CIS synchronization delay of the left-channel voice data, a CIG synchronization delay of the left-channel voice data, a time offset of the left-channel voice data, an isochronous interval of the left-channel voice data, a service data unit interval of the left-channel voice data, and a Timestamp of the left-channel voice data, and based on at least one of the following: a CIS reference anchor point of the right-channel voice data, a CIS synchronization delay of the right-channel voice data, a CIG synchronization delay of the right-channel voice data, a time offset of the right-channel voice data, an isochronous interval of the right-channel voice data, a service data unit interval of the right-channel voice data, and a Timestamp of the right-channel voice data.

In one embodiment, for example, the first Bluetooth communication circuit 121 and the second Bluetooth communication circuit 131 may transmit the left-channel voice data and the right-channel voice data in the form of framed Protocol Data Units (framed PDUs) in the aforementioned first CIS logical transport and second CIS logical transport. In this situation, the processing circuit 117 may calculate the packet timing difference between the left-channel voice data and the right-channel voice data based on a CIS reference anchor point of the left-channel voice data, a CIS synchronization delay of the left-channel voice data, a CIG synchronization delay of the left-channel voice data, and a time offset of the left-channel voice data, and based on a CIS reference anchor point of the right-channel voice data, a CIS synchronization delay of the right-channel voice data, a CIG synchronization delay of the right-channel voice data, and a time offset of the right-channel voice data.

For another example, in another embodiment, the first Bluetooth communication circuit 121 and the second Bluetooth communication circuit 131 may transmit the left-channel voice data and the right-channel voice data in the form of unframed Protocol Data Units (unframed PDUs) in the aforementioned first CIS logical transport and second CIS logical transport. In this situation, the processing circuit 117 may calculate the packet timing difference between the left-channel voice data and the right-channel voice data based on a CIS reference anchor point of the left-channel voice data, a CIS synchronization delay of the left-channel voice data, a CIG synchronization delay of the left-channel voice data, an isochronous interval of the left-channel voice data, and a service data unit interval of the left-channel voice data, and based on a CIS reference anchor point of the right-channel voice data, a CIS synchronization delay of the right-channel voice data, a CIG synchronization delay of the right-channel voice data, an isochronous interval of the right-channel voice data, and a service data unit interval of the right-channel voice data.

For another example, in another embodiment, the first control circuit 129 may add a Timestamp corresponding to the generation time of the left-channel voice data in the left-channel Bluetooth packets, and the second control circuit 139 may add a Timestamp corresponding to the generation time of the right-channel voice data in the right-channel Bluetooth packets. In this situation, the processing circuit 117 may calculate the packet timing difference between the left-channel voice data and the right-channel voice data based on the Timestamp of the left-channel voice data and the Timestamp of the right-channel voice data.

In the operation 312, the stereo generation module 240 may control the processing circuit 117 to establish a timing correlation between the left-channel voice data and the right-channel voice data based on the calculated packet timing difference.

In the operation 314, the stereo generation module 240 may control the processing circuit 117 to generate a stereo voice data based on the timing correlation between the left-channel voice data and the right-channel voice data. In operations, the processing circuit 117 may combine the left-channel voice data and the right-channel voice data of corresponding time points (or establish a timing relationship between the left-channel voice data and the right-channel voice data of corresponding time points) based on the timing correlation between the left-channel voice data and the right-channel voice data to generate corresponding stereo voice data.

In the operation 316, the stereo generation module 240 may control the processing circuit 117 to utilize the signal transceiver circuit 115 to transmit the stereo voice data to the remote device 140. For example, the processing circuit 117 may convert the generated stereo voice data into corresponding stereo voice signal, and may utilize the signal transceiver circuit 115 to transmit the aforementioned stereo voice signal to the remote device 140 through corresponding networks.

Then, the remote device 140 may acquire the stereo voice data generated by the Bluetooth host device 110 from the stereo voice signal transmitted from the signal transceiver circuit 115. The remote device 140 may utilize appropriate audio playback devices to playback the stereo voice data generated by the Bluetooth host device 110. As a result, during the period in which the remote user (i.e., the user of the remote device 140) conducts voice communication with the local user (i.e., the user of the Bluetooth voice communication system 100), the remote user is enabled to enjoy the stereo voice communication quality that cannot be provided by the traditional Bluetooth communication device.

When the local user utilizes the Bluetooth voice communication system 100 to conduct voice communication with the remote user, the signal transceiver circuit 115 of the Bluetooth host device 110 may utilize the aforementioned various wired network transmission technologies or Radio Access Technologies (RATs) to receive voice data transmitted from the remote device 140 through various networks. The processing circuit 117 may convert the voice data received by the signal transceiver circuit 115 into corresponding Bluetooth packets, and may utilize the host-side Bluetooth communication circuit 111 to transmit the aforementioned Bluetooth packets to the first Bluetooth communication circuit 121 through the aforementioned first CIS logical transport, and/or to transmit the aforementioned Bluetooth packets to the second Bluetooth communication circuit 131 through the aforementioned second CIS logical transport.

When the first Bluetooth communication circuit 121 receives the Bluetooth packets transmitted from the host-side Bluetooth communication circuit 111, the first control circuit 129 extracts the voice data from the Bluetooth packets, and controls the first audio processing circuit 127 to encode the voice data into corresponding first audio signal.

Then, the first control circuit 129 may instruct the first audio playback circuit 125 to playback the first audio signal generated by the first audio processing circuit 127, so that the local user is enabled to hear the voice contents transmitted from the remote device 140.

Similarly, when the second Bluetooth communication circuit 131 receives the Bluetooth packets transmitted from the host-side Bluetooth communication circuit 111, the second control circuit 139 extracts the voice data from the Bluetooth packets, and controls the second audio processing circuit 137 to encode the voice data into corresponding second audio signal. Then, the second control circuit 139 may instruct the second audio playback circuit 135 to playback the second audio signal generated by the second audio processing circuit 137, so that the local user is enabled to hear the voice contents transmitted from the remote device 140.

In some embodiments, the Bluetooth host device 110 may utilize only one of the first Bluetooth member device 120 and the second Bluetooth member device 130 to playback the voice data transmitted from the remote device 140.

In other embodiments, the Bluetooth host device 110 may simultaneously utilize the first Bluetooth member device 120 and the second Bluetooth member device 130 to playback the voice data transmitted from the remote device 140.

For example, when the remote device 140 adopts the same mechanism for generating stereo voice adopted by the aforementioned Bluetooth voice communication system 100, the remote device 140 may generate stereo voice data corresponding to the conversation content of the remote user and transmit the aforementioned stereo voice data to the signal transceiver circuit 115. In this situation, the processing circuit 117 may convert the stereo voice data received by the signal transceiver circuit 115 into corresponding host-generated left-channel Bluetooth packets and host-generated right-channel Bluetooth packets. The processing circuit 117 may utilize the host-side Bluetooth communication circuit 111 to transmit the aforementioned host-generated left-channel Bluetooth packets to the first Bluetooth communication circuit 121 through the aforementioned first CIS logical transport, and to transmit the aforementioned host-generated right-channel Bluetooth packets to the second Bluetooth communication circuit 131 through the aforementioned second CIS logical transport.

In this situation, the first control circuit 129 may control the first audio processing circuit 127 to encode the voice data in the host-generated left-channel Bluetooth packets into a corresponding first audio signal. Then, the first control circuit 129 may instruct the first audio playback circuit 125 to playback the first audio signal generated by the first audio processing circuit 127, so that the local user is enabled to hear the left-channel content of the stereo voice transmitted from the remote device 140.

On the other hand, the second control circuit 139 may control the second audio processing circuit 137 to encode the voice data in the host-generated right-channel Bluetooth packets into a corresponding second audio signal. Then, the second control circuit 139 may instruct the second audio playback circuit 135 to playback the second audio signal generated by the second audio processing circuit 137, so that the local user is enabled to hear the right-channel content of the stereo voice transmitted from the remote device 140.

As a result, during the period in which the local user (i.e., the user of the Bluetooth voice communication system 100) conducts voice communication with the remote user (i.e., the user of the remote device 140), the local user is enabled to enjoy the stereo voice communication quality that cannot be provided by the traditional Bluetooth communication device.

As can be appreciated from the foregoing descriptions, during the period in which the local user utilizes the Bluetooth voice communication system 100 to conduct voice communication with the remote user, the first voice receiving circuit 123 of the first Bluetooth member device 120 and the second voice receiving circuit 133 of the second Bluetooth member device 130 both capture sounds generated by the local user at the same time, and respectively generate corresponding left-channel voice data and right-channel voice data. The packet timing difference calculation module 230 controls the processing circuit 117 to calculate the packet timing difference between the left-channel voice data and the right-channel voice data. The stereo generation module 240 controls the processing circuit 117 to establish a timing correlation between the left-channel voice data and the right-channel voice data based on the calculated packet timing difference, and to generate stereo voice data corresponding to the left-channel voice data and the right-channel voice data.

Therefore, during the period in which the remote user (i.e., the user of the remote device 140) conducts the voice communication with the local user (i.e., the user of the Bluetooth voice communication system 100), the remote device 140 only needs to utilize appropriate audio playback devices to playback the stereo voice data generated by the Bluetooth host device 110, so that the remote user is enabled to enjoy the stereo voice communication quality that cannot be provided by the traditional Bluetooth communication device.

In addition, if the remote device 140 also adopts the same mechanism for generating stereo voice adopted by the aforementioned Bluetooth voice communication system 100, the remote device 140 can generate and transmit stereo voice data corresponding to the conversation content of the remote user to the signal transceiver circuit 115. In this situation, the Bluetooth host device 110 can utilize the first Bluetooth member device 120 to playback the left-channel content of the stereo voice transmitted from the remote device 140, and utilize the second Bluetooth member device 130 to synchronously playback the right-channel content of the stereo voice transmitted from the remote device 140. As a result, during the period in which the user of the Bluetooth voice communication system 100 conducts voice communication with the user of the remote device 140, the user of the Bluetooth voice communication system 100 is enabled to enjoy the stereo voice communication quality that cannot be provided by the traditional Bluetooth communication device.

In other words, by adopting the method for generating stereo voice of FIG. 3, the disclosed Bluetooth voice communication system 100 can not only support the Bluetooth LE Audio technology, but also enable the relevant user to enjoy the stereo voice communication quality that cannot be provided by the traditional Bluetooth communication device when conducting voice communication.

Please note that the executing order of the operations in aforementioned FIG. 3 is merely an exemplary embodiment, rather than a restriction to the practical implementations of the present disclosure. For example, the executing order of the operation 302 and the operation 304 may be swapped, or alternatively, the operation 302 and the operation 304 may be performed at the same time. For another example, the executing order of the operation 306 and the operation 308 may be swapped, or alternatively, the operation 306 and the operation 308 may be performed at the same time.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth voice communication system (100), comprising:
   a Bluetooth host device (110), arranged to operably conduct voice communication with a remote device (140), the Bluetooth host device (110) comprising:
      a host-side Bluetooth communication circuit (111), arranged to operably receive or transmit Bluetooth packets;
      a Bluetooth packet parsing circuit (113), coupled with the host-side Bluetooth communication circuit (111), and arranged to operably to parse the Bluetooth packets received by the host-side Bluetooth communication circuit (111);
      a signal transceiver circuit (115), arranged to operably receive or transmit wireless signal; and
      a processing circuit (117), coupled with the host-side Bluetooth communication circuit (111), the Bluetooth packet parsing circuit (113), and the signal transceiver circuit (115), and arranged to operably control operations of the host-side Bluetooth communication circuit (111), the Bluetooth packet parsing circuit (113), and the signal transceiver circuit (115);
   a first Bluetooth member device (120), comprising:
      a first Bluetooth communication circuit (121), arranged to operably receive or transmit Bluetooth packets;
      a first voice receiving circuit (123), arranged to operably capture sounds;
      a first audio playback circuit (125), arranged to operably playback a first audio signal;
      a first audio processing circuit (127), coupled with the first voice receiving circuit (123) and the first audio playback circuit (125), and arranged to operably generate the first audio signal, and arranged to operably generate a left-channel voice data based on sounds captured by the first voice receiving circuit (123); and
      a first control circuit (129), coupled with the first Bluetooth communication circuit (121) and the first audio processing circuit (127), and arranged to operably utilize the first Bluetooth communication circuit (121) to transmit the left-channel voice data to the Bluetooth host device (110); and
   a second Bluetooth member device (130), comprising:
      a second Bluetooth communication circuit (131), arranged to operably receive or transmit Bluetooth packets;
      a second voice receiving circuit (133), arranged to operably capture sounds;
      a second audio playback circuit (135), arranged to operably playback a second audio signal;
      a second audio processing circuit (137), coupled with the second voice receiving circuit (133) and the second audio playback circuit (135), and arranged to operably generate the second audio signal, and arranged to operably generate a right-channel voice data based on sounds captured by the second voice receiving circuit (133); and
      a second control circuit (139), coupled with the second Bluetooth communication circuit (131) and the second audio processing circuit (137), and arranged to operably utilize the second Bluetooth communication circuit (131) to transmit the right-channel voice data to the Bluetooth host device (110);
   wherein the host-side Bluetooth communication circuit (111) is further arranged to operably receive the left-channel voice data transmitted from the first Bluetooth communication circuit (121) and the right-channel voice data transmitted from the second Bluetooth communication circuit (131), and the processing circuit (117) is further arranged to operably generate a stereo voice data based on the left-channel voice data and the right-channel voice data by combining the left-channel voice data and the right-channel voice data of corresponding time points based on a timing correlation between the left-channel voice data and the right-channel voice data, or by establishing a timing relationship between the left-channel voice data and the right-channel voice data of corresponding time points based on the timing correlation between the left-channel voice data and the right-channel voice data;
   wherein the host-side Bluetooth communication circuit (111) is further arranged to operably utilize the signal transceiver circuit (115) to transmit the stereo voice data to the remote device (140).

2. The Bluetooth voice communication system (100) of claim 1, wherein the processing circuit (117) is further arranged to operably establish a first Connected Isochronous Stream logical transport between the host-side Bluetooth communication circuit (111) and the first Bluetooth communication circuit (121), and arranged to operably establish a second Connected Isochronous Stream logical transport between the host-side Bluetooth communication circuit (111) and the second Bluetooth communication circuit (131);
   wherein the host-side Bluetooth communication circuit (111) receives the left-channel voice data transmitted from the first Bluetooth communication circuit (121) through the first Connected Isochronous Stream logical transport, and receives the right-channel voice data transmitted from the second Bluetooth communication circuit (131) through the second Connected Isochronous Stream logical transport.

3. The Bluetooth voice communication system (100) of claim 2, wherein the processing circuit (117) is further arranged to operably calculate a packet timing difference between the left-channel voice data and the right-channel voice data.

4. The Bluetooth voice communication system (100) of claim 3, wherein the processing circuit (117) is further arranged to operably calculate the packet timing difference between the left-channel voice data and the right-channel voice data based on a CIS reference anchor point of the left-channel voice data, a CIS synchronization delay (CIS_Sync_Delay) of the left-channel voice data, a CIG synchronization delay (CIG_Sync_Delay) of the left-channel voice data, a time offset (Time_Offset) of the left-channel voice data, an isochronous interval (ISO_Interval) of the left-channel voice data, a service data unit interval (SDU Interval) of the left-channel voice data, or a Timestamp of the left-channel voice data, and based on a CIS reference anchor point of the right-channel voice data, a CIS synchronization delay (CIS_Sync_Delay) of the right-channel voice data, a CIG synchronization delay (CIG_Sync_Delay) of the right-channel voice data, a time offset (Time_Offset) of the right-channel voice data, an isochronous interval (ISO_Interval) of the right-channel voice data, a service data unit interval (SDU Interval) of the right-channel voice data, or a Timestamp of the right-channel voice data.

5. The Bluetooth voice communication system (100) of claim 3, wherein the processing circuit (117) is further arranged to operably establish the timing correlation between the left-channel voice data and the right-channel voice data based on the packet timing difference, and arranged to operably generate the stereo voice data based on the left-channel voice data, the right-channel voice data, and the timing correlation.

6. A computer program product, stored in a storage circuit (119) of a Bluetooth host device (110) which is utilized to conduct voice communication with a remote device (140), when executed by a processing circuit (117) of the Bluetooth host device (110), enabling the Bluetooth host device (110) to conduct a stereo voice generating operation, the computer program product comprising:
a left-channel processing module (210), arranged to operably utilize a host-side Bluetooth communication circuit (111) of the Bluetooth host device (110) to receive a left-channel voice data generated by a first Bluetooth member device (120) based on sounds captured by the first Bluetooth member device (120);
a right-channel processing module (220), arranged to operably utilize the host-side Bluetooth communication circuit (111) to receive a right-channel voice data generated by a second Bluetooth member device (130) based on sounds captured by the second Bluetooth member device (130); and
a stereo generation module (240), arranged to operably generate a stereo voice data based on the left-channel voice data and the right-channel voice data by combining the left-channel voice data and the right-channel voice data of corresponding time points based on a timing correlation between the left-channel voice data and the right-channel voice data, or by establishing a timing relationship between the left-channel voice data and the right-channel voice data of corresponding time points based on the timing correlation between the left-channel voice data and the right-channel voice data;
wherein the stereo generation module (240) is further arranged to operably utilize a signal transceiver circuit (115) of the Bluetooth host device (110) to transmit the stereo voice data to the remote device (140).

7. The computer program product of claim 6, wherein the left-channel processing module (210) is further arranged to operably establish a first Connected Isochronous Stream logical transport between the host-side Bluetooth communication circuit (111) and the first Bluetooth member device (120), and the right-channel processing module (220) is further arranged to operably establish a second Connected Isochronous Stream logical transport between the host-side Bluetooth communication circuit (111) and the second Bluetooth member device (130);
wherein the host-side Bluetooth communication circuit (111) receives the left-channel voice data transmitted from the first Bluetooth member device (120) through the first Connected Isochronous Stream logical transport, and receives the right-channel voice data transmitted from the second Bluetooth member device (130) through the second Connected Isochronous Stream logical transport.

8. The computer program product of claim 7, further comprising:
a packet timing difference calculation module (230), arranged to operably calculate a packet timing difference between the left-channel voice data and the right-channel voice data.

9. The computer program product of claim 8, wherein the packet timing difference calculation module (230) is further arranged to operably calculate the packet timing difference between the left-channel voice data and the right-channel voice data based on a CIS reference anchor point of the left-channel voice data, a CIS synchronization delay (CIS_Sync_Delay) of the left-channel voice data, a CIG synchronization delay (CIG_Sync_Delay) of the left-channel voice data, a time offset (Time_Offset) of the left-channel voice data, an isochronous interval (ISO_Interval) of the left-channel voice data, a service data unit interval (SDU Interval) of the left-channel voice data, or a Timestamp of the left-channel voice data, and based on a CIS reference anchor point of the right-channel voice data, a CIS synchronization delay (CIS_Sync_Delay) of the right-channel voice data, a CIG synchronization delay (CIG_Sync_Delay) of the right-channel voice data, a time offset (Time_Offset) of the right-channel voice data, an isochronous interval (ISO_Interval) of the right-channel voice data, a service data unit interval (SDU Interval) of the right-channel voice data, or a Timestamp of the right-channel voice data.

10. The computer program product of claim 8, wherein the stereo generation module (240) is further arranged to operably establish the timing correlation between the left-channel voice data and the right-channel voice data based on the packet timing difference, and arranged to operably generate the stereo voice data based on the left-channel voice data, the right-channel voice data, and the timing correlation.

* * * * *